(12) United States Patent
Noma et al.

(10) Patent No.: US 6,271,155 B1
(45) Date of Patent: Aug. 7, 2001

(54) COMPOSITE SHEET COMPRISING A NON-WOVEN FABRIC AND A FILM

(75) Inventors: Takeshi Noma, Osaka; Shingo Horiuchi; Yoshimi Tsujiyama, both of Shiga, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/245,649

(22) Filed: Feb. 8, 1999

Related U.S. Application Data

(63) Continuation of application No. PCT/JP97/02901, filed on Aug. 20, 1997.

(30) Foreign Application Priority Data

Aug. 26, 1996 (JP) .................................................... 8-224138

(51) Int. Cl.$^7$ .............................. B32B 27/02; B32B 27/12
(52) U.S. Cl. ...................... 442/398; 442/361; 442/364; 442/394
(58) Field of Search ................................. 442/394, 398, 442/361, 364

(56) References Cited

U.S. PATENT DOCUMENTS

| 4,522,203 | 6/1985 | Mays ..................................... 128/849 |
| 5,534,339 | 7/1996 | Stokes .................................. 442/361 |

FOREIGN PATENT DOCUMENTS

| 1200697A | 12/1998 | (CN) . |
| 1209170A | 2/1999 | (CN) . |
| 42 34 816 C1 | 10/1993 | (DE) . |
| 0 586 936 | 3/1994 | (EP) . |
| 0 586 937 | 3/1994 | (EP) . |
| 0 604 736 | 7/1994 | (EP) . |
| 2 300 595 | 11/1996 | (GB) . |
| 59-149903 | 10/1984 | (JP) . |
| 7-276573 | 10/1995 | (JP) . |
| WO 96/40513 | 12/1996 | (WO) . |
| WO 97/09173 | 3/1997 | (WO) . |
| WO 97/23676 | 7/1997 | (WO) . |

OTHER PUBLICATIONS

PCT Application, China 97197494.2, Aug. 11, 2000.

*Primary Examiner*—Elizabeth M. Cole
*Assistant Examiner*—John J. Guarriello
(74) *Attorney, Agent, or Firm*—Merchant & Gould P.C.

(57) ABSTRACT

A composite laminated sheet comprises a thermoplastic crystalline film and a non-woven fabric having a thermoplastic conjugated fiber comprising the low melting point component and the high melting point component, in which the difference in the melting point between the low melting point component and the high melting point component is not less than 10° C.; the difference in the melting point between the thermoplastic crystalline film and the low melting point component of the conjugated fiber is not more than 30° C.; and the temperature of the position corresponding to 10% of the area from the side of the melting starting point of the endothermic peak of an entire conjugated fiber evaluated by DSC is between the melting starting point and the melting completion point of the endothermic peak of the film evaluated by DSC. According to the present invention, a composite sheet is provided in which a non-woven fabric and a film are adhered without adhesive agents, the appearance is excellent, and the adhesive strength between the non-woven fabric and the film is high. Consequently, the composite sheet of the present invention can be used for a water-proof sheets, for example, paper diapers or sanitary napkins or the like.

12 Claims, 7 Drawing Sheets

COMPOSITE SHEET COMPRISING A NON-WOVEN FABRIC AND A FILM

This application is a continuation of international application number PCT/JP97/02901, filed Aug. 20, 1997, pending.

TECHNICAL FIELD

The invention relates to a composite sheet comprising a film and non-woven fabric having softness and an excellent touch (hereinafter, a laminated non-woven fabric sheet will be used for an abbreviation). More particularly, it relates to a laminated non-woven fabric sheet combining a non-woven fabric and a film, which is useful for water-proof substrates (water impermeable substrates) of paper diapers, sanitary napkins or the like.

BACKGROUND ART

Hitherto, films comprising a thermoplastic resin have been used as water-proof substrates of paper diapers, sanitary napkins or the like. However, in a case where thermoplastic resin films are used for the above mentioned water-proof substrates, there are some problems. In other words, such water-proof substrates give a cool touch to users' skin; are not cloth-like in appearance due to glistening, so that they do not look like high quality products; and do not have a good touch. In order to solve the above mentioned problems, that is, to provide a high quality cloth-like appearance, and soft and warm touch, various kinds of non-woven fabrics are laminated by adhering to a plastic film by the use of hot melt resin or the like. In order to laminate non-woven fabrics by the use of a hot melt resin, an apparatus for spraying a hot melt resin, a hot melt type adhesive comprising a low temperature melting resin that does not cause thermal damage to a film and a non-woven fabric are required, thus increasing the weight and the cost of the products. Moreover, a large area for adhering is required to ensure an excellent adhesion between a film and a non-woven fabric, so that it is difficult to apply hot melt resins as an adhesive agent inconspicuously and uniformly.

The object of the present invention is to solve the above mentioned problems and to provide a composite sheet comprising a non-woven fabric and a film (a laminated non-woven fabric sheet), which is suitable for a water-proof sheet of, for example, paper diapers or sanitary napkins, where a film and a non-woven fabric are adhered without using a specific adhesive such as a hot melt type adhesive or the like, so that the appearance is excellent, and a non-woven fabric and a film are easily and tightly bonded.

DISCLOSURE OF INVENTION

The laminated non-woven fabric sheet of the present invention is a composite sheet comprising a thermoplastic crystalline film and a non-woven fabric comprising thermoplastic conjugated fibers, wherein the thermoplastic conjugated fiber comprise a low melting point component and a high melting point component, and the difference in the melting points between the low melting point component and the high melting point component is not less than 10° C.; the difference in the melting point between the thermoplastic crystalline film and the low melting point component of the conjugated fiber is not more than 30° C.; and the temperature of the position corresponding to 10% of the area from the side of the melting starting point of the endothermic peak of an entire conjugated fiber evaluated by DSC is between the melting starting point and the melting completing point of the endothermic peak of the film evaluated by DSC.

It is preferable in the laminated non-woven fabric sheet of the present invention that an endothermic peak of the thermoplastic conjugated fiber of an entire conjugated fiber evaluated by DSC is separated into an endothermic peak of a low melting point component and an endothermic peak of a high melting point component with respect to the base line of the endothermic peak curve, and the temperature of the position corresponding to 20% of the area from the side of the melting starting point of the endothermic peak of the low melting point component of the conjugated fiber is between the melting starting point and the melting completing point of the endothermic curve of the thermoplastic crystalline film evaluated by DSC.

It is further preferable in the laminated non-woven fabric sheet of the present invention that the thermoplastic crystalline film has an air permeability and is one selected from the group consisting of a linear low density polyethylene film and a polypropylene film.

It is further preferable in the laminated non-woven fabric sheet of the present invention that a material of the thermoplastic crystalline film and a material of the low melting point component of the thermoplastic conjugated fiber are made of materials of the same group, and the difference in the melting points between the thermoplastic crystalline film and the low melting point component of the conjugated fiber is not more than 5° C.

It is further preferable in the laminated non-woven fabric sheet of the present invention that the melting point of the low melting point component of the thermoplastic conjugated fiber is lower than the melting point of the thermoplastic crystalline film.

It is further preferable in the laminated non-woven fabric sheet of the present invention that the low melting point component of the thermoplastic conjugated fiber is at least one selected from the group consisting of linear low density polyethylene, olefin binary copolymer and olefin terpolymer.

It is further preferable in the laminated non-woven fabric sheet of the present invention that the olefin binary copolymer is an ethylene-propylene copolymer comprising 85 to 99 wt. % of propylene and 1 to 15 wt. % of ethylene.

It is further preferable in the laminated non-woven fabric sheet of the present invention that the olefin binary copolymer is a butene-propylene copolymer comprising 50 to 99 wt. % of propylene and 1 to 50 wt. % of 1-butene.

It is further preferable in the laminated non-woven fabric sheet of the present invention that the olefin binary copolymer is an ethylene-octene copolymer comprising 73 to 99 wt. % of ethylene and 1 to 27 wt. % of 1-octene.

It is further preferable in the laminated non-woven fabric sheet of the present invention that the olefin terpolymer is an ethylene-butene-propylene terpolymer comprising 84 to 97 wt. % of propylene, 1 to 15 wt. % of 1-butene and 1 to 10 wt. % of ethylene.

It is further preferable in the laminated non-woven fabric sheet of the present invention that the thermoplastic crystalline film and the non-woven fabric are laminated by a thermal adhesion bonding.

It is further preferable in the laminated non-woven fabric sheet of the present invention that the thermoplastic conjugated fiber which constitutes the non-woven fabric is a thermoplastic conjugated fiber comprising filaments.

BEST MODE FOR CARRYING OUT THE INVENTION

Figure 1:
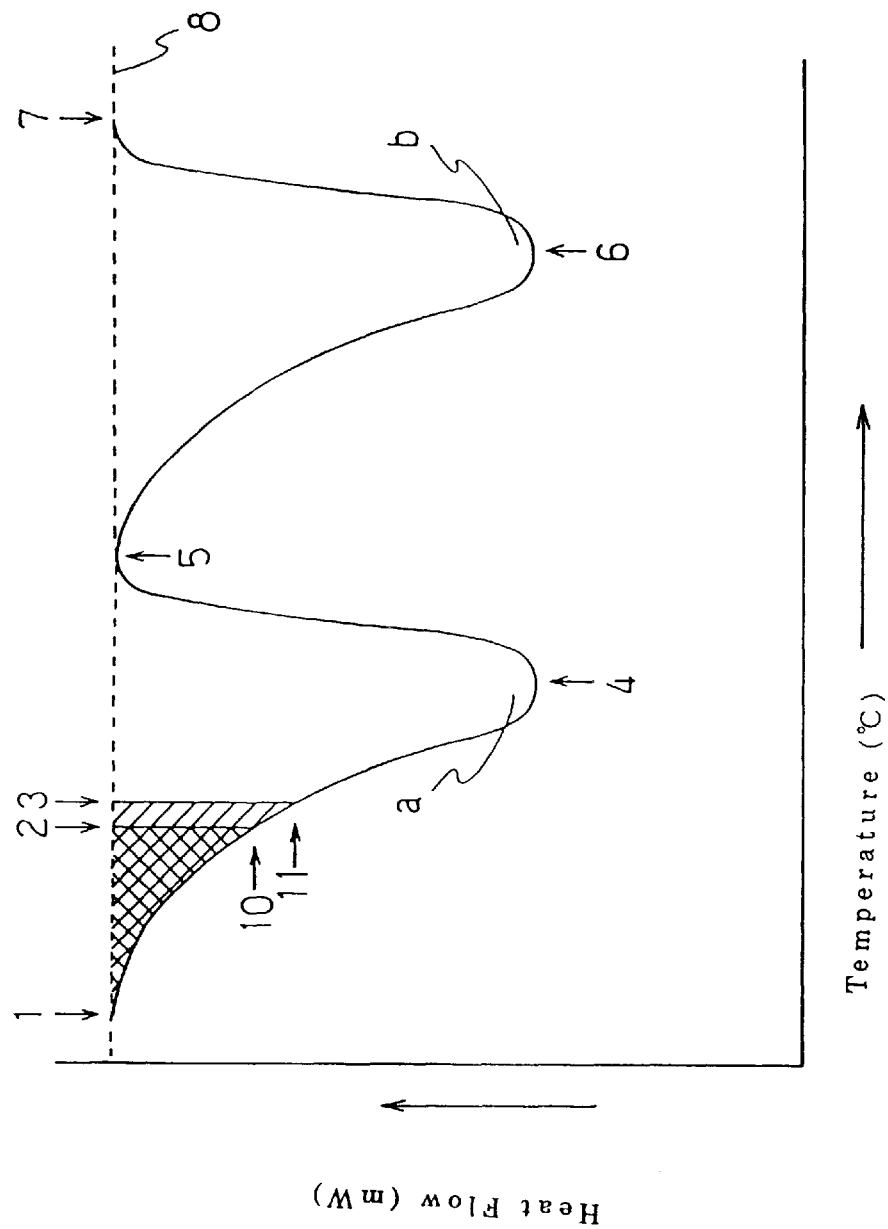
FIG. 1 is an endothermic peak curve from DSC analysis showing one embodiment of the thermoplastic conjugated fiber of the present invention.

As the thermoplastic crystalline film used in the present invention, the well known thermoplastic crystalline film can be used. Typical examples of the thermoplastic crystalline film include: a linear low density polyethylene film, a high density polyethylene film, polypropylene film, polyethylene terephthalate film or the like. These thermoplastic crystalline films are the most popular and can easily be obtained at a low price, but the thermoplastic crystalline film is not limited to them alone. A multi layered film may be used, but it is advantageous to use mono layer films from the view point of the cost. The reason for using a crystalline film instead of other thermoplastic films is: the crystalline film has a relatively high strength and suffers little damage (little generation of holes) during the thermal adhesion.

The thickness of these films can be determined depending upon the respective applications. In particular, it is preferable that the thickness is in the range of 10 to 40 $\mu$m. However, the thickness is not limited to the above mentioned range. In addition, it is preferable that these films are biaxially stretched, but non-oriented films may be used.

Moreover, when the films are used for an application that contacts with the human body, for example, water-proof sheets of paper diapers or sanitary napkins or the like, it is preferable that a film has an air permeability. Herein, the air permeability denotes a state in which the water vapor permeability is not less than 1500 g/m$^2$ ·24 Hr while keeping a hydraulic pressure resistance of not less than 2000 mm H$_2$O under the following conditions specified in JIS K7129: a test temperature is 32° C. and a relative humidity is 50% RH. Such films are commercially available. Examples of the commercially available film include "ESPOIR"(a linear low density polyethylene film, the product of Mitsui Toatsu Chemicals, Inc.).

Therefore, in a case where films are used for the water-proof sheets (water-proof substrates) of paper diapers or sanitary napkins or the like, films that are provided with air permeability by the presence of such a large holes that liquid water can permeate are not preferred as a water-proof substrate.

Examples of the non-woven fabrics comprising a thermoplastic conjugated fiber of the present invention may include: a non-woven fabric comprising conjugated fiber (staple fiber) made by a carding process; a non-woven fabric comprising conjugated fiber (staple fiber) made by an air-laid method; a non-woven fabric comprising conjugated fiber (staple fiber) made by a wet method for paper making, and a non-woven fabric comprising conjugated fiber (staple fiber) made by a melt-blowing process; and a non-woven fabric comprising conjugated fiber (filament, more specifically a continuous filament) made by a spun bond method. In particular, a non-woven fabric comprising filaments is preferably used since it has a high strength and little fuzz. Especially, the non-woven fabric made by the spun bond method is preferable, since non-woven fabrics can be manufactured without application of fiber spinning oil agents, a stretching step is not conducted after the solidification of a melt spinning filament spun out of the spinneret, and crystalline orientation is less likely to occur in the filaments as compared with staple fibers made by a method having a stretching step, so that such filaments are easily bonded to a thermoplastic crystalline film. Moreover, the spun bond method is preferable since the cost is reasonable.

As a thermoplastic conjugated fiber of a non-woven fabric of the present invention, it is necessary to use a thermoplastic conjugated fiber in which the difference in the melting points between a low melting point component and a high melting point component is not less than 10° C. In a case where the conjugated fiber having the difference in the melting points between a low melting point component and a high melting point component is less than 10° C., the high melting point component, which primarily provides the strength of the conjugated fiber, is damaged or deteriorated in its physical property etc. at the time of the thermal adhesion with the film. As a result, the hand feeling of the composite sheet tends to be hard, and the bulkiness of the non-woven fabric is liable to be reduced.

An endothermic peak curve from DSC (differential scanning calorimetry) analysis of an entire conjugated fiber varies according to the combinations or types of the low melting point components and the high melting point components of the conjugated fiber. Typical types of the endothermic peak curves are shown in FIG. 1 to FIG. 7. Herein, each mark has the following denotation respectively. Mark "a" denotes an endothermic peak of the low melting point component of the conjugated fiber; "$a_1$" denotes an endothermic peak of the component having a lower melting point when the low melting point component of the conjugated fiber comprises a mixture of two members; "$a_2$" denotes an endothermic peak of the component having a higher melting point when the low melting point component of the conjugated fiber comprises a mixture of two members; "b" denotes an endothermic peak of the high melting point component of the conjugated fiber; numeral 1 denotes a melting starting point, 2 denotes a temperature corresponding to 10% of the area from the side of the melting starting point of the endothermic peak of the entire conjugated fiber from DSC analysis; 3 denotes a temperature corresponding to 20% of the area from the side of the melting starting point of the endothermic peak of the low melting point components of the conjugated fiber ("a" or "a1"+"a2") from DSC analysis; 4 denotes a melting point of the low melting point component; 4' denotes a melting point of the component having a lower melting point when the low melting point component comprises a mixture of two members; 4" denotes a melting point of the component having the higher melting point when the low melting point component comprises a mixture of two members; 5, 5', 5" each denotes a trough of the endothermic peaks; 6 denotes a melting point of the high melting point component; 7 denotes a melting completion point (in other words, the point in which melting or a phase transition completes); and 8 denotes a base line of the endothermic peak curve. In FIG. 1 to FIG. 7, a vertical axis shows a heat flow (heat flux) (in general, the unit is mW or milliwatt) and corresponds to endothermic energy; and a horizontal axis shows temperatures (in general, the unit is ° C.).

Figure 4:
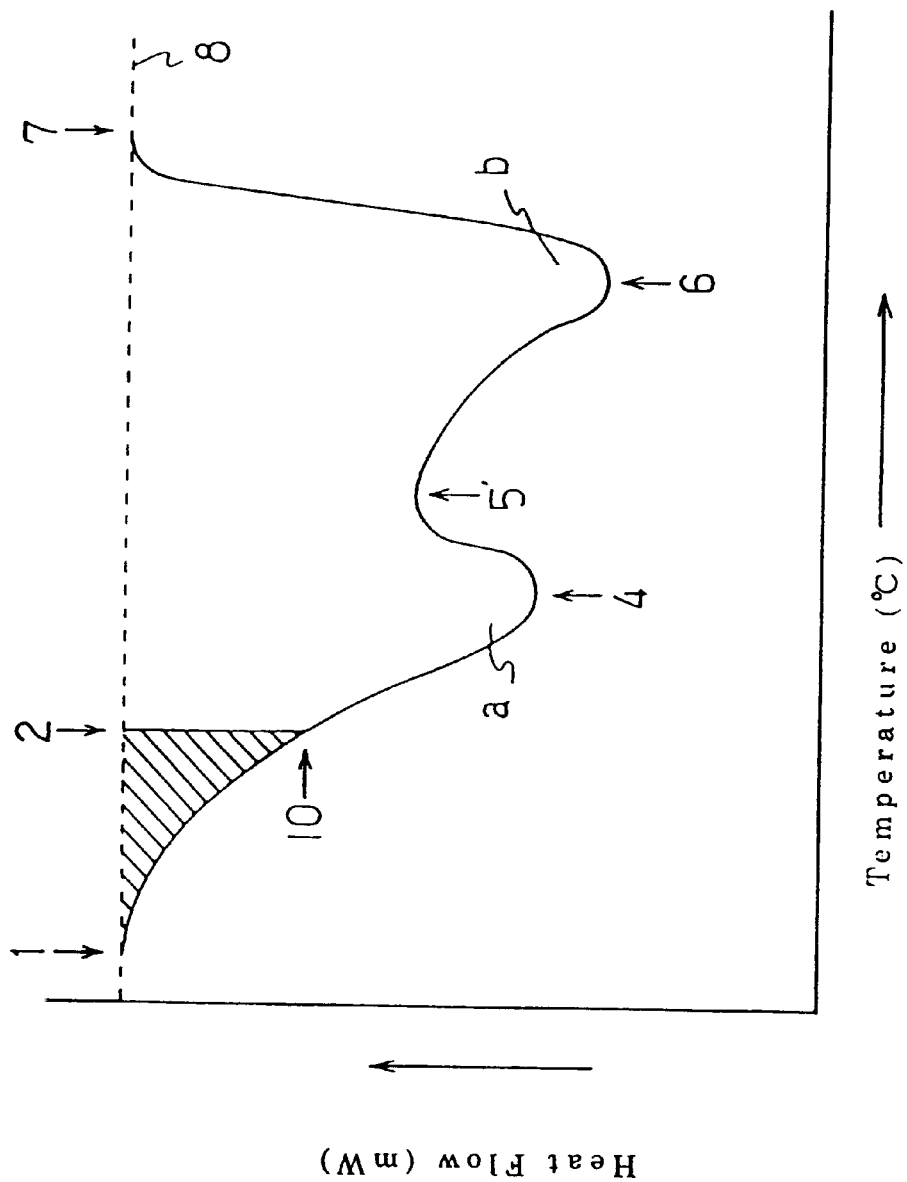
FIG. 4 is an endothermic peak curve form DSC analysis showing a further embodiment of the thermoplastic conjugated fiber of the present invention.

FIG. 1 is an endothermic peak curve from DSC analysis, showing one embodiment of a thermoplastic conjugated fiber, wherein the endothermic peak of the entire conjugated fiber from DSC analysis is separated into an endothermic peak of the low melting point component "a" and an endothermic peak of the high melting point component "b" based on the base line 8 of the endothermic peak curve. Herein, the base line of the endothermic peak curve denotes the DSC curve in the temperature range in which a transition and a reaction in a test piece do not occur in DSC. When the temperature range is narrow, the base line is sometimes regarded as a straight line. Moreover, "is separated into an endothermic peak of the low melting point component "a" and an endothermic peak of the high melting point component "b" based on the base line 8 of the endothermic peak curve" means that a trough 5 of the endothermic peaks of the endothermic peak curve contacts with the base line 8, so that an endothermic peak of the low melting point component "a" and an endothermic peak of the high melting point component "b" appear as two completely separate and distinct peaks or more. For example, as shown in FIG. 4 etc. which are described later, the case where the trough 5' of an endothermic peak does not contact with the base line 8 of the endothermic peak curve, even if the endothermic peak of the low melting point component "a" and the endothermic peak of the high melting point component "b" have two peaks or more as represented by 4 and 6, is not included in the category: "a thermoplastic conjugated fiber, wherein the endothermic peaks of an entire conjugated fiber evaluated by DSC is separated into an endothermic peak of the low melting point component "a" and an endothermic peak of the high melting point component "b" with respect to the base line 8 of the endothermic peak curve". Conjugated fibers as shown in FIGS. 4 to 7, which are not included in this category, namely, the endothermic peak curves of the conjugated fiber are not separated into two peaks, can also be preferably used in the present invention. However, the fibers in which "the endothermic peaks evaluated by DSC are separated into an endothermic peak of the low melting point component "a" and an endothermic peak of the high melting point component "b" with respect to the base line 8 of the endothermic peak curve" is more preferably used, because a film and a non-woven fabric are likely to be thermally adhered in the temperature range where thermal damage such as a relaxation of the orientation of the high melting point component etc. are less likely to occur.

Figure 2:
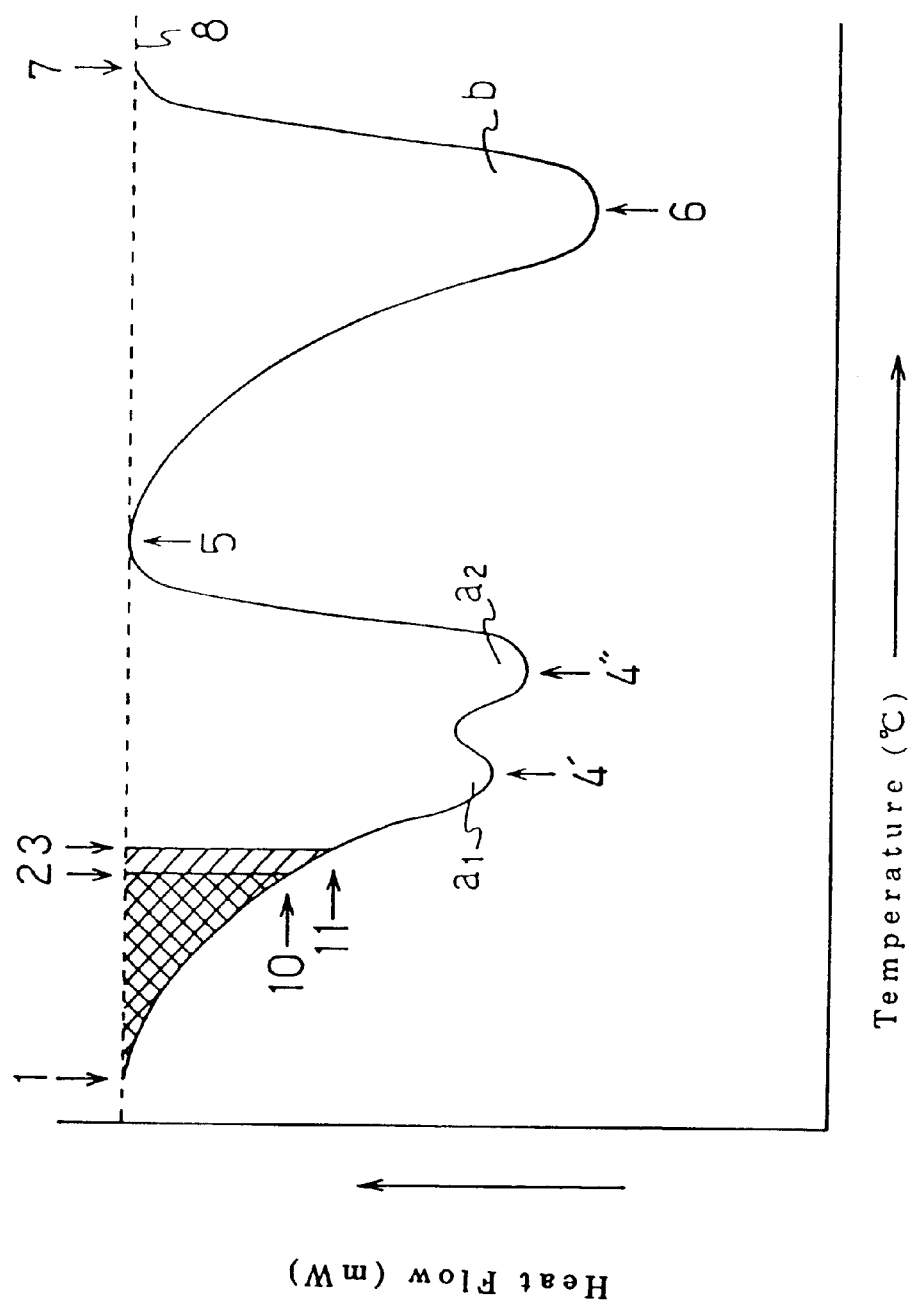
FIG. 2 is an endothermic peak curve from DSC analysis showing another embodiment of the thermoplastic conjugated fiber of the present invention.

FIG. 2 is an endothermic peak curve form DSC analysis, showing another embodiment of a thermoplastic conjugated fiber, wherein the endothermic peaks of an entire conjugated fiber are separated into an endothermic peak of the low melting point component and an endothermic peak of the high melting point component with respect to the base line of the endothermic peak curve. As is apparent from FIG. 2, in a case where a low melting point component of the conjugated fiber comprises two kinds of polymer members, a peak appears twice in the endothermic peak curve. That is, an endothermic peak a1 of the component having a lower melting point of the low melting point component has a peak 4', and an endothermic peak a2 of the component having a higher melting point of the low melting point component shows a peak 4". In a case where a low melting point component of a conjugated fiber comprises more than two polymer mixtures, a peak sometimes appears at three times or more (not shown). In any case, a trough 5 of the endothermic peaks in the endothermic peak curve contacts with the base line 8 of the endothermic peak curve. Therefore, the endothermic peaks are shown twice: one is represented by $a_1, a_2, \ldots a_n$, which are the endothermic peaks of the low melting point components ($a_n$ denotes an n-th peak appearing on the DSC curve of an n-th low melting point component and corresponds to the melting point of an n-th component, wherein n is a positive integer); another is represented by "b", which is the endothermic peak of the high melting point component. Therefore, such is included in one of the preferable examples of a thermoplastic conjugated fiber wherein the endothermic peaks of an entire conjugated fiber evaluated by DSC are separated into an endothermic peak of the low melting point component and an endothermic peak of the high melting point component with respect to the base line 8 of the endothermic peak curve.

Figure 3:
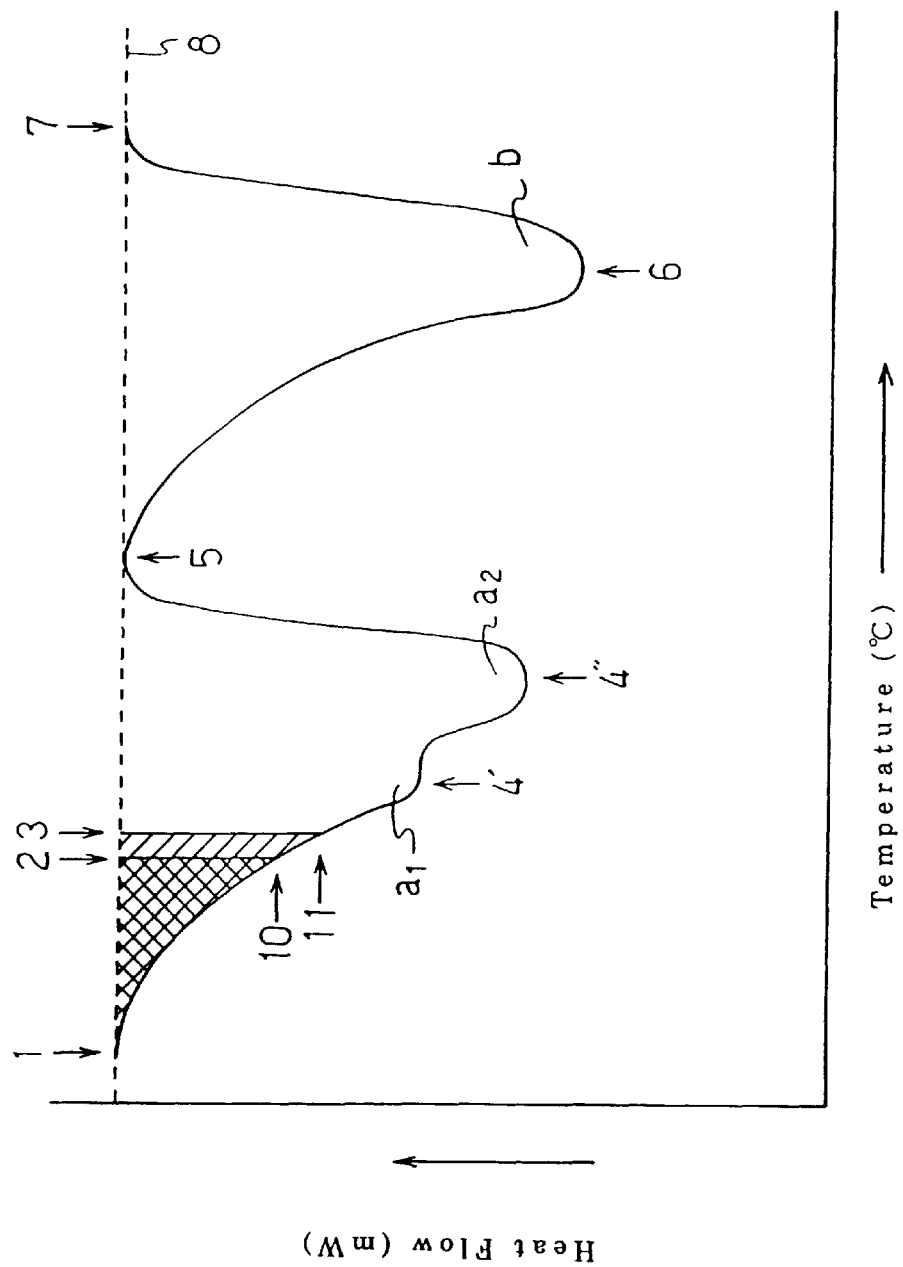
FIG. 3 is an endothermic peak curve from DSC analysis showing a further embodiment of the thermoplastic conjugated fiber of the present invention.

FIG. 3 is an endothermic peak curve from DSC analysis, showing a further embodiment of a thermoplastic conjugated fiber, wherein the endothermic peak of an entire conjugated fiber by DSC is separated into an endothermic peak of the low melting point component and an endothermic peak of the high melting point component with respect to the base line of the endothermic curve. The endothermic peak curve of FIG. 3 is a little bit different from that of FIG. 2 in the following point: for example, in a case where a low melting point component of a conjugated fiber comprises a mixture of two kinds of polymers, the endothermic peak of a component having a lower melting point of the low melting point component "a1" and the endothermic peak of a component having a higher melting point of the low melting point component "a2" do not appear in the form of two peaks (shown by FIGS. 4' and 4") like FIG. 2, but one of the peaks appears in the form of a shoulder- shaped point as shown by 4' of FIG. 3. This is likely to be shown in the case where the melting points of A1 and B1 are relatively close. Herein, A1 and B1 represent the two kinds of components constituting the mixed low melting point component. When the low melting point component is a mixture comprising more than two polymers (not shown), two or more shoulder- shaped points appear. In any case, a trough 5 of the endothermic peaks in the endothermic peak curve contacts with the base line 8 of the endothermic peak curve. Therefore, the endothermic peaks are shown twice: one is represented by $a_1, a_2, \ldots a_n$, which are endothermic peaks of the low melting point component ($a_n$ denotes an n-th peak appearing on the DSC curve of an n-th low melting point component and corresponds to the melting point of an n-th component, wherein n is a positive integer); another is represented by "b", which is an endothermic peak of the high melting point component. Therefore, such is included in one of the preferable examples of a thermoplastic conjugated fiber wherein the endothermic peaks of an entire conjugated fiber evaluated by DSC are separated into an endothermic peak of the low melting point component and an endothermic peak of the high melting point component with respect to the base line 8 of the endothermic peak curve.

In a case where two or more peaks or shoulder- shaped points appear on the endothermic peak curve from DSC analysis, as shown in FIG. 2 and FIG. 3, that is, in a case where a low melting point component comprises two or more thermoplastic polymer mixtures, the melting point of the low melting point component in the present invention denotes a melting point of the component having the highest melting point among the above mentioned two or more thermoplastic polymers. In FIG. 2 or FIG. 3, the temperature of the position represented by a peak 4" is defined as a melting point of the low melting point component of the conjugated fiber.

Next, FIG. 4 is an endothermic peak curve from DSC analysis, showing one embodiment of a thermoplastic conjugated fiber, wherein the endothermic peak of the entire conjugated fiber evaluated by DSC is not completely separated into an endothermic peak of the low melting point component and an endothermic peak of the high melting point component with respect to the base line of the endothermic peak curve. (Hereinafter, "non-separate type endothermic peak" will be used for an abbreviation.) In this type of the endothermic curve of the conjugated fiber, unlike the endothermic peak curve shown in FIG. 1, the endothermic peak of the low melting point component "a" and an endothermic peak of the high melting point component "b" are shown as two or more peaks as represented by 4 and 6, but the trough 5' of the endothermic peaks does not contact with the base line 8 of the endothermic peak.

Figure 5:
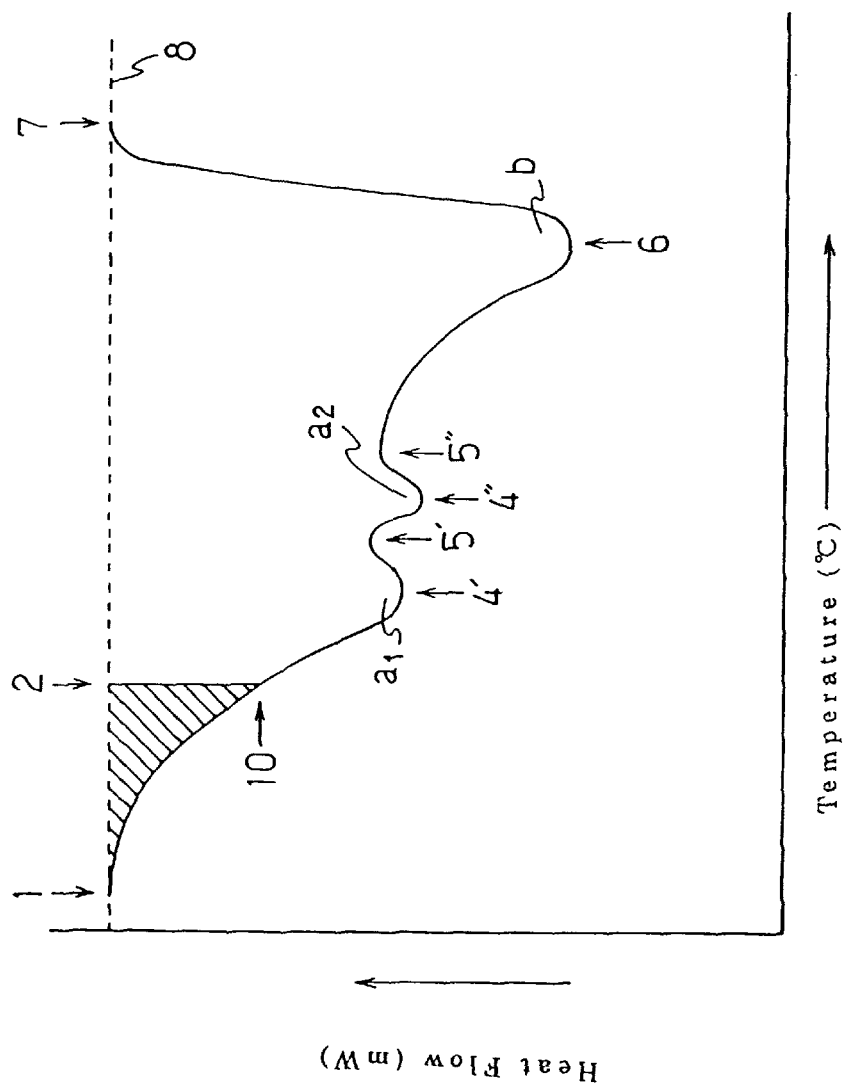
FIG. 5 is an endothermic peak curve form DSC analysis showing a further embodiment of the thermoplastic conjugated fiber of the present invention.

Next, FIG. 5 is an endothermic peak curve of the conjugated fiber from DSC analysis, showing another embodiment of the thermoplastic conjugated fiber of the non-separate type endothermic peak. In a case where a low melting point component of the conjugated fiber comprises a mixture of two polymers, the peak appears twice on the endothermic peak curve. That is, an endothermic peak of the component having a lower melting point of the low melting point component a1 shows the peak 4', and an endothermic peak of the component having a higher melting point of the low melting point component a2 shows the peak 4". As explained in FIG. 2, in a case where a low melting point component of a conjugated fiber comprises a mixture of more than two polymers, a peak sometimes appears at three times or more (not shown).

Figure 6:
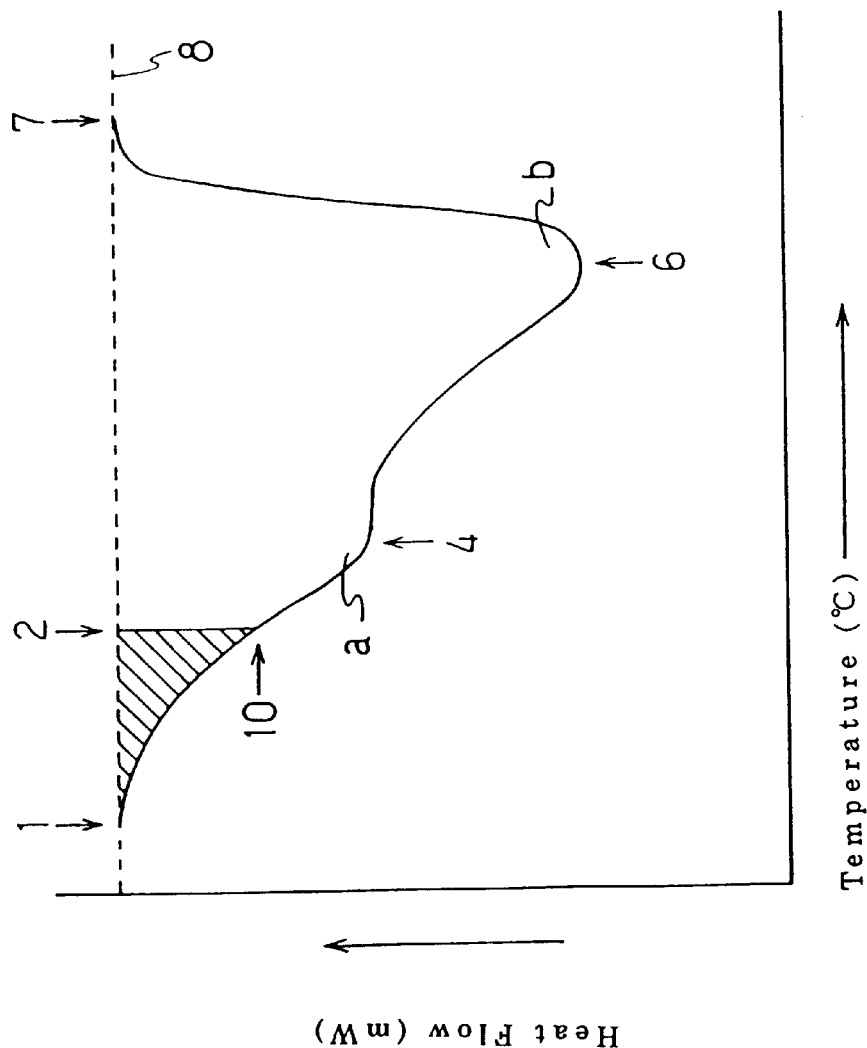
FIG. 6 is an endothermic peak curve from DSC analysis showing a further embodiment of the thermoplastic conjugated fiber of the present invention.

FIG. 6 is an endothermic peak curve of the conjugated fiber from DSC analysis, showing a further embodiment of the thermoplastic conjugated fiber of the non-separate type endothermic peak. In this case, the melting point 4 of the low melting point component "a" is not in the form of a peak, but is a shoulder- shaped point. The melting point of the endothermic peak of the high melting point component "b" is a temperature represented by 6. Such pattern of the endothermic peak curve tends to be shown when the melting points of the low melting point component and the high melting point component are closer as compared with the cases shown in FIG. 1 or FIG. 4.

Figure 7:
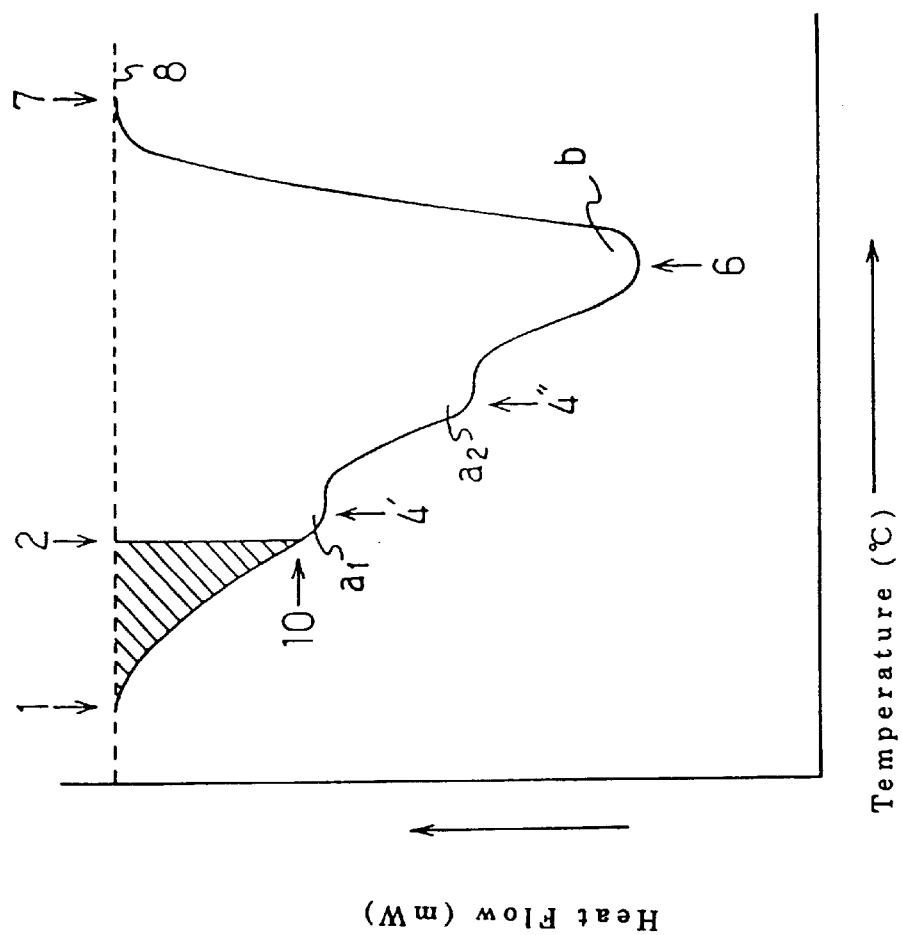
FIG. 7 is an endothermic peak curve from DSC analysis showing a further embodiment of the thermoplastic conjugated fiber of the present invention.

FIG. 7 is an endothermic peak curve of the conjugated fiber from DSC analysis, showing a further embodiment of the thermoplastic conjugated fiber of the non-separate type endothermic peak. This is likely to be shown in a case where the melting points of A1 and B1 are relatively close. Herein, A1 and B1 represent two kinds of components constituting the mixture for a low melting point component. When the low melting point component is a mixture comprising more than two polymers (not shown), two or more shoulder-shaped points appear.

In a case where two or more peaks or shoulder-shaped points appear on the endothermic peak curve from DSC analysis, as shown in FIG. 5 or FIG. 7, that is, in a case where a low melting point component comprises a mixture of two or more thermoplastic polymers, the melting point of the low melting point component of the present invention denotes a melting point of the component having the highest melting point among the above mentioned two or more thermoplastic polymers. In FIG. 5 or FIG. 7, the temperature of the position represented by the peak 4" is defined as the melting point of the low melting point component of the conjugated fiber.

While the endothermic peak curves illustrated in FIG. 4 to FIG. 7 are called "a non-separate type endothermic peak", the endothermic peak curves illustrated in FIG. 1 to FIG. 3 are merely called "a separate type endothermic peak hereinafter." In the present invention, in the non-separate type endothermic peak as shown in FIG. 4 to FIG. 7, "a temperature corresponding to 10% of the area from the side of the melting starting point of the endothermic peak of an entire conjugated fiber evaluated by DSC" is: if, for example, the hatched portion (the portion edged by a line linking 1, 2, and 10) is supposed to correspond to 10% with respect to the area surrounded by the endothermic peak curve and the base line, the temperature of the point represented by 2 is the above defined temperature. On the other hand, in the case of the separate type endothermic peak as shown in FIG. 1 to FIG. 3, "a temperature corresponding to 10% of the area from the side of the melting starting point of the endothermic peak of an entire conjugated fiber evaluated by DSC" denotes as follows: in FIG. 1, if the hatched portion (the portion edged by a line linking 1, 2, and 10) is supposed to correspond to 10% with respect to the area surrounded by the peak "a", "b" and the base line, the temperature of the point represented by 2 is the above defined temperature; and in FIG. 2 or FIG. 3, if the hatched portion (the portion edged by the line linking 1, 2, and 10) is supposed to correspond to 10% with respect to the total area surrounded by the peak "a1", "a2", and "b" and the base line, the temperature of the point represented by 2 is the above defined temperature. In addition, in the separate type endothermic peak explained in FIG. 1 to FIG. 3, "a temperature corresponding to 20% of the area from the side of the melting starting point of the endothermic peak of a low melting point component" of the above mentioned conjugated fiber denotes as follows. In FIG. 1, for example, if the area to which an opposite hatching is given (the portion edged by a line linking 1, 3, and 11) is supposed to correspond to 20% with respect to the area surrounded by only the peak "a" and the base line, in which the area surrounded by the endothermic peak "b" and the base line is not included, the temperature of the point represented by 3 is the above defined temperature. On the other hand, in FIG. 2 or FIG. 3, if the area to which an opposite hatching is given (the portion edged by a line linking 1, 3, and 11) is supposed to correspond to 20% with respect to the area surrounded by only the peak "a1", "a2" and the base line 8, in which the area surrounded by the endothermic peak "b" and base line is not included, the temperature of the point represented by 3 is the above defined temperature.

As the conjugated fiber used in the present invention, a sheath and core type conjugated fiber or a side-by-side type conjugated fiber is used. The sheath and core type conjugated fiber includes an eccentric core and sheath type conjugated fiber. In the sheath and core type conjugated fiber, a low melting point component is used for a sheath, and a high melting point component is used for a core. In particular, the use of an eccentric sheath and core type conjugated fiber or side-by-side type conjugated fiber makes it possible to produce a crimped fiber, thus preferably producing a non-woven fabric having a high bulkiness and a good hand feeling. In the side-by-side type conjugated fiber, the ratio of the low melting point component to the high melting point component in the cross section may be 1:1. Needless to say, one component may account for more than another component in the cross section. The volume ratio (this corresponds to the area ratio when a cross section of the fiber is considered) of the low melting point component to the high melting point component is usually 10:90 to 90:10. More preferably, the ratio is 30:70 to 70:30.

As the high melting point component of the conjugated fiber, a thermoplastic crystalline resin is used. Specific examples of the thermoplastic crystalline resins include high density polyethylene, polypropylene, polyethylene terephthalate, and polyamide such as nylon 6 and nylon 66. Among the above mentioned examples, polypropylene and polyethylene terephthalate are preferably used.

As the low melting point component of the conjugated fiber, a linear low density polyethylene, olefin binary copolymer and olefin terpolymer or the mixture of two or more of them are preferably used. Two or more kinds of different olefin binary copolymers may be blended at the optional ratio. Moreover, two or more different kinds of olefin terpolymer may be blended at the optional ratio. Since each binary copolymer or terpolymer may be used alone, the blending ratio of each copolymer is not specifically limited and can be optionally determined. If the blending ratio is numerically expressed: in the case of using two kinds of blending components, 0 wt. %<a wt. %<100 wt. %, b wt. %=100 wt. %−a wt. %, wherein a wt. % denotes the blending ratio of one component with respect to the total weight, and b wt. % denotes the blending ratio of another component with respect to the total weight; in the case of using three kinds of blending components, each component is more than 0 wt. % and less than 100 wt. %, and as long as the total weight is 100 wt. %, the blending ratio of each component is optionally determined.

Specific examples of the above mentioned olefin binary copolymer and olefin terpolymer include: ethylene-propylene copolymer comprising 85 to 99 wt. % of propylene and 1 to 15 wt. % of ethylene, butene-propylene copolymer comprising 50 to 99 wt. % of propylene and 1 to 50 wt. % of 1-butene, ethylene-octene-copolymer comprising 73 to 99 wt. % of ethylene and 1 to 27 wt . % of 1-octene (more preferably ethylene-octene copolymer comprising 75 to 98 wt . % of ethylene and 2 to 25 wt. % of 1 octene), and ethylene-butene-propylene copolymer comprising 84 to 97 wt. % of propylene, 1 to 15 wt. % of 1-butene and 1 to 10 wt. % of ethylene. It is preferable for the above mentioned copolymers to be used since a softness peculiar to the copolymers is exhibited, a softness or a hand feeling or touch or the like is excellent, and the thermal adhesion to the above mentioned linear low density polyethylene film or polypropylene film etc. is good. In addition, as a low melting point component of the conjugated fiber, in bonding to a polyethylene terephthalate film, for example, polyethylene terephthalate-isophthalate copolymer or other low melting polyester copolymer can be used.

In any case, in combining a thermoplastic crystalline film and a non-woven fabric comprising thermoplastic conjugated fiber, a thermoplastic crystalline film and a non-woven fabric comprising a thermoplastic conjugated fiber should satisfy the following condition:

the thermoplastic conjugated fiber comprises a low melting point component and a high melting point component, and the difference in the melting point between a low melting point component and a high melting point component is not less than 10° C.; the difference in the melting point between the thermoplastic crystalline film and the low melting point component of the conjugated fiber is not more than 30° C.; and the temperature of the position corresponding to 10% of the area from the side of the melting starting point of the endothermic peak of an entire conjugated fiber evaluated by DSC is between the melting starting point and the melting completing point of the endothermic peak of the film evaluated by DSC. If the combination of a thermoplastic crystalline film and a non-woven fabric comprising a thermoplastic conjugated fiber, which does not satisfy the above mentioned conditions, is selected, the adhesion between the thermoplastic crystalline film and the non-woven fabric comprising thermoplastic conjugated fiber is deteriorated. As a result, an excellent composite sheet cannot be obtained. Furthermore, if the thermoplastic crystalline film and the non-woven fabric comprising a thermoplastic conjugated fiber are forced to be thermally adhered, holes are made on the film, or the conjugated fibers are thermally damaged, so that there arise some disadvantages: for example, the bulkiness of the non-woven fabric is reduced, the hand feeling is deteriorated etc.

More preferably, as a combination of a thermoplastic conjugated fiber and a film, in addition to the above mentioned conditions, the combination which satisfies the following conditions is selected: an endothermic peak of the thermoplastic conjugated fiber of an entire conjugated fiber evaluated by DSC is separated into an endothermic peak of a low melting point component and an endothermic peak of a high melting point component with respect to the base line of the endothermic peak curve, and the temperature of the position corresponding to 20% of the area from the side of the melting starting point of the endothermic peak of the low melting point component of the conjugated fiber is between the melting starting point and the melting completion point of the endothermic curve of the thermoplastic crystalline film from DSC analysis. If the combination where such conditions are further added is selected, the thermal adhesion can easily be conducted under the temperature conditions in which the thermal damage such as a relaxation of orientation of high melting point component is less likely to occur, thus of a resin for the a being preferable.

Combinations of the above mentioned conjugated fiber include low density polyethylene/polypropylene (an example of the low melting point component resin/an example of the high melting point component resin are described and are the same as hereinafter), low density polyethylene/high density polyethylene, low density and/or high density polyethylene/polyethylene terephthalate or the like. In addition to the above mentioned resins, the combination of the low melting point component which is at least one selected from the group consisting of the above mentioned linear low density polyethylene, olefin binary copolymer and olefin terpolymer, and the high melting point component which is selected from polypropylene or polyethylene terephthalate or the like is preferably used.

In a case where a non-woven fabric is obtained by the use of conjugated staple fiber, a conjugated fiber comprising the combination of the low melting component and the high melting point component can easily be obtained, since they are commercially available. The conjugated fiber produced by the spun bond method is commercially available and can easily be obtained. Moreover, a non-woven fabric can be made of a staple fiber spun from the conjugated fiber by the use of a spinneret, and a non-woven fabric can be directly made from the conjugated fiber by the melt-blow method. Moreover, a non-woven fabric directly made of filament by the spun bond method or the like by applying a means for manufacturing a conjugated filament can further be obtained.

In the present invention, in thermally adhering a non-woven fabric and a film, as mentioned above, the combination of the thermoplastic crystalline film and the non-woven fabric comprising a thermoplastic conjugated fiber should be selected in a way that satisfies the following points: the thermoplastic conjugated fiber comprises a low melting point component and a high melting point component, and the difference in the melting points between the low melting point component and the high melting point component is not less than 10° C.; the difference in the melting point between the thermoplastic crystalline film and the low melting point component of the conjugated fiber is not more than 30° C.; and the temperature of the position corresponding to 10% of the area from the side of the melting starting point of the endothermic peak of an entire conjugated fiber by DSC is between the melting starting point and the melting completion point of the endothermic peak of the film evaluated by DSC. In addition to the above mentioned conditions, it is more preferable that the combination of the thermoplastic crystalline film and non-woven fabric comprising a thermoplastic conjugated fiber satisfies the condition in which an endothermic peak of an entire conjugated fiber of the thermoplastic conjugated fiber evaluated by DSC is separated into an endothermic peak of a low melting point component and an endothermic peak of a high melting point component with respect to the base line of the endothermic peak curve as a standard, and the temperature of the position corresponding to 20% of the area from the side of the melting starting point of the endothermic peak of the low melting point component of the conjugated fiber is between the melting starting point and the melting completion point of the endothermic curve of the thermoplastic crystalline film evaluated by DSC. For example, if a film comprising linear low density polyethylene and a non-woven fabric produced from a single element of polypropylene by the spun bond method are used, they are not well adhered by only thermal adhesion. Further, if the temperature is forced to rise so as to adhere the non-woven fabric and the film, holes are generated in the film, so that the water proof (water impermeable) property cannot be exhibited.

Moreover, in the present invention, it is necessary that the difference between the melting point of the thermoplastic crystalline film and the melting point of the low melting point component of the conjugated fiber is not more than 30° C. If the difference in the melting points is more than 30° C., the thermal adhesion between a non-woven fabric and a film is deteriorated. Furthermore, if the temperature is raised so as to adhere the non-woven fabric and the film, when the melting point of the thermoplastic crystalline film is lower than the melting point of the low melting point component of the conjugated fiber of the non-woven fabric, large holes are generated in the film, or physical properties of the film are greatly damaged by heat. Moreover, in the same case as the above mentioned case except that the melting point of the thermoplastic crystalline film is higher than the melting point of the low melting point component of the conjugated fiber of the non-woven fabric, the physical property of the high melting point component of the conjugated fiber composing the non-woven fabric is more damaged by heat, and the bulkiness is more reduced and the hand feeling of the non-woven fabric seems harder. Therefore, this case is not preferable as compared with the above mentioned case.

In the present invention, the combination of the film and the non-woven fabric wherein the thermoplastic crystalline film and the low melting point component of the thermoplastic conjugated fiber are made of materials of the same group, and the difference in the melting points between the thermoplastic crystalline film and the low melting point component of the conjugated fiber is not more than 5° C. is preferable to attain more excellent adhesion and higher adhering strength. Herein, "the same group" denotes belonging to the same polymer series in the broader classification of polymer. It means "homolog", in other words. Specific examples include, for example, the combination of one polyolefin and another polyolefin such as a combination of polyethylene and ethylene-propylene copolymer etc., the combination of one polyester and another polyester, the combination of one polyamide and another polyamide, or the like.

In the present invention, it is preferable that the combination of a film and a non-woven fabric wherein non-woven fabric comprising a staple fiber and/or a filament comprising a conjugated fiber comprising a low melting point component and a high melting point component is used and the low melting point component of the non-woven fabric is softened and adhered at the temperature that does not cause thermal damage to the film. Therefore, in addition to the above mentioned conditions, the combination between a film and a non-woven fabric, wherein the melting point of the low melting component of the thermoplastic conjugated fiber is lower than the melting point of the thermoplastic crystalline film is more preferable.

The thermal adhesion process of these films and non-woven fabrics may include: a method using a thermal embossing roll, an ultrasonic welding method, a method using a hot air drier, and a method using a far infrared radiation heater or the like. Moreover, the non-woven fabric is not always required to be previously produced. A fiber may be bonded to a film in the step where a fiber is made to be a non-woven fabric. For example, a film is placed on a not bonded card web, and the film and the web may be adhered by the use of a thermal embossing roll. Moreover, in a case where the thermal adhesion process by the use of a thermal embossing roll is applied, if necessary, the thermal adhesion may be conducted in a way that the thermal embossing roll is made to contact with the side of the non-woven fabric, and the non-heated or cooling smooth roll or a rubber roll is made to contact with the side of the film.

The non-woven fabric may be laminated on one side of the film or on both sides of the film. The appropriate laminated combination can be applied depending on the applications or demands of users. A basis weight (weight per square meter) of the non-woven fabric used for lamination is not particularly limited, and an appropriate basis weight is determined depending on the applications. The basis weight of the non-woven fabric is usually in the range of 5 to 50 g/m$^2$. For the application of the water proof substrates of the paper diapers or sanitary napkins, it is preferably in the range of 10 to 30 g/m$^2$.

Concerning absorbent articles such as paper diapers and sanitary napkins and the like, these articles usually comprise a liquid permeable top sheet, liquid impermeable back sheet, and absorbent core comprising water-absorbent resin particles and hydrophilic fiber material, the absorbent core being located between the back sheet and the top sheet. Details of these absorbent articles are disclosed in U.S. Pat. No. 3,670,731 and U.S. Pat. No. 4.,654,039.

The liquid impermeable back sheet means the water proof substrate. The laminated non-woven fabric sheet of the present invention is suitable for the water proof substrates of the absorbent articles.

Hereinafter, the present invention will be further described by referring to Examples and Comparative Examples but is not limited to them alone.

DSC and peeling strength are evaluated by the below methods respectively. (DSC): Preferably, portions of the test pieces are collected excluding the portions whose thermal history is clearly high, for example, the thermal adhesion portion or the like, and measured. The heating rate is increased at 10° C. per minute. The weight of the test piece is approximately 4 mg. The measurement is conducted to a 0.01 mg level. A container for a sample used herein is made of aluminum. The aluminum of the container has a uniform thickness and a purity of 99.9 to 99.99%. In order to enhance the thermal conduction, samples are placed thinly in the center of the container, and pressed to the bottom of the container in order to remove air existing between sample and the bottom surface of the container at the predetermined pressure. As an atmospheric gas, nitrogen gas is used, and oxygen or water are removed. The measurement temperature in the present invention is the temperature of the sample itself, in other words, without conducting the specific heat treatment, for example, melting the samples in advance. The temperature corresponding to the area of the endothermic peak is measured based on the conditions specified in JIS K 7122, namely, a peak curve is copied with a copier and cut out, and the weight is measured, or is measured on the screen for analysis.

(Peeling strength): The pieces of the laminated non-woven fabric sheet are cut in a rectangle having a width of 2.5 cm. In the rectangular shaped non-woven fabric, the bonding face between a non-woven fabric and a film is partly peeled. The tensile strength measurement test is carried out by pulling each edge of the non-woven fabric and the film at the bonding face by using a tensile tester ("AUTOGRAPH", the product of Shimadzu Corporation). The average value of the strength is calculated. When the peeling strength is at least 70 g/a width of 2.5 cm, the strength is judged to withstand to normal use.

EXAMPLE 1

A concentric sheath and core type conjugated staple fiber composed of polypropylene (the melting point from DSC analysis was 160° C.) as a core component and linear low density polyethylene (the melting point from DSC analysis was 125° C.) as a sheath component at the volume ratio of 50:50 was used. The temperature of the position corresponding to 10% of the area from the side of the melting starting point of the endothermic peak of an entire conjugated fiber evaluated by DSC was 103° C., and the temperature of the position corresponding to 20% of the area from the side of the melting starting point of the endothermic peak of the low melting point component of the conjugated fiber was 105° C. The fiber had a fineness of 2 d/f and a cut length of 51 mm and was made into a web having a basis weight (weight per square meter) of 25 g/m² by the carding method. The web was introduced into a thermal embossing roll. At the same time, a linear low density polyethylene film of a thickness of 25 μm and a water vapor permeability of 1500 g/m²·24 h ("ESPOIR", the product of Mitsui Toatsu Chemicals, Inc.; the melting starting point of the endothermic peak from DSC analysis was 61° C., the melting completion point was 132° C., and the melting point was 120° C.) was introduced into the side of the thermal rubber roll. The web and the film were thermally adhered at the embossing roll temperature of 115° C., the rubber roll temperature of 55° C., a linear pressure (a linear load) of 28 kg/cm, and the processing rate of 10 m/min. At this time, the shape of the surface of the convex portion of the embossing roll was a laterally longer rhombus and the area of each convex portion was 0.35 mm² (1.18×0.59 mm), the height of the convex portion was 0.65 mm and the area ratio of the convex portion was 15%.

The peeling strength between the non-woven fabric and film of the resultant laminated non-woven fabric sheet was measured. The value was 100 g/a width of 2.5 cm, exhibiting sufficient adhesion. Moreover, no defects such as pin-holes due to heat were observed on the film portion. Since the film and the non-woven fabric were adhered without using a specific adhesive resin such as hot melt type adhesive agent in the composite sheet of the present invention, the hot melt type adhesive agents are not attached to an unnecessary portion and the portion to which the hot melt type resin was attached was not conspicuous. Consequently, the laminated non-woven fabric sheet suitable for the water proof substrates of paper diapers or sanitary napkins was obtained, in which the appearance was excellent and the non-woven fabric and film were easily and tightly bonded. Herein, the pattern of the endothermic peak of an entire conjugated fiber evaluated by DSC was classified in the type shown in FIG. 1.

EXAMPLE 2

A commercially available composite spun bond non-woven fabric composed of polyethylene terephthalate (the melting point from DSC analysis was 260° C.) as a core component and high density polyethylene (the melting point from DSC analysis was 129° C.) as a sheath component at the volume ratio of 60:40 ("ELEVES," the product of UNITIKA, LTD, was used. The temperature of the position corresponding to 10% of the area from the side of the melting starting point of the endothermic peak of an entire conjugated fiber evaluated by DSC was 115° C., and the temperature of the position corresponding to 20% of the area from the side of the melting starting point of the endothermic peak of the low melting point component of the conjugated fiber was 120° C. The basis weight of a non-woven fabric was 20 g/m². The fabric was preliminarily heated by using a far infrared radiation heater (the temperature of the surface of the non-woven fabric measured by the use of a heat sensitive paper was 125° C.). Then, this non-woven fabric and the linear low density polyethylene film (a melting starting point of the endothermic peak evaluated by DSC was 61° C., a melting completion point was 132° C., and a melting point was 120° C.) which was the same as that used in Example 1 were adhered while cooling by using a rubber touch roll at the side of the non-woven fabric and a chrome mirror-face roll (temperature of the roll was room temperature) at the side of the film.

The peeling strength between the non-woven fabric and film of the resultant laminated non-woven fabric sheet was measured. The value was 100 g/a width of 2.5 cm. Moreover, no defects such as pin-holes due to heat were observed on the film portion. The pattern of the endothermic peak of an entire conjugated fiber evaluated by DSC was classified as the type shown in FIG. 1.

EXAMPLE 3

A conjugated fiber composed of polypropylene (the melting point from DSC analysis was 160° C.) as a core component and linear low density polyethylene (the melting point from DSC analysis was 122° C.) as a sheath component at the volume ratio of 50:50 was made by the melt spinning method by the use of an eccentric core and sheath type spinneret. The spinneret had 120 circular spinning holes with a diameter of 0.4 mm. The fibers spun out of the spinneret were introduced into an air sucker where stretching was conducted. Thus, a group of filaments were produced. Then, a group of filaments discharged from the air sucker were made to pass between a couple of vibrating wing-like tool for an opening. A group of the opened filaments was collected on an endless belt conveyor having a suction apparatus on its back face to form filament webs. At this time, the fineness of the filament was controlled to 2.2 d/f by varying the stretching rate of the air sucker. The resultant eccentric core and sheath type conjugated filament was made into a web having a basis weight of 25 g/m$^2$ by controlling the moving rate of the endless belt conveyor. Then, the non-woven fabric was obtained at the temperature of 127° C. by a hot air through process. (The resultant non-woven fabric had the temperature of the position corresponding to 10% of the area from the side of the melting starting point of the endothermic peak of an entire conjugated fiber evaluated by DSC of 101° C., and the temperature of the position corresponding to 20% of the area from the side of the melting starting point of the endothermic peak of the low melting point component of the conjugated fiber was 105° C.) Then, the resultant non-woven fabric was introduced into the thermal embossing roll. At the same time, a linear low density polyethylene film which was the same as that used in Example 1 (a melting starting point of the endothermic peak from DSC analysis was 61° C., a melting completion point was 132° C., and a melting point was 120° C.) was introduced at the side of the thermal rubber roll. The non-woven fabric and the film were thermally adhered at the embossing roll temperature of 109° C., the rubber roll temperature of 50° C., a linear load of 28 kg/cm, and the processing rate of 10 m/min. At this time, the shape of the convex portion of this embossing roll was a laterally longer rhombus and the area of each convex portion was 0.35 mm$^2$ (1.18×0.59 mm), the height of the convex portion was 0.65 mm and the area ratio of the convex portion was 15%.

The peeling strength between the non-woven fabric and film of the resultant laminated non-woven fabric sheet was measured. The value was 130 g/a width of 2.5 cm, exhibiting a sufficient adhesion. Moreover, no defects such as pin-holes due to heat were observed on the film portion. The pattern of the endothermic peak of an entire conjugated fiber evaluated by DSC was classified as the type shown in FIG. 1.

EXAMPLES 4 and 5

A conjugated filament composed of a core component and a sheath component at the volume ratio of 50:50 was made by the melt spinning method by the use of a concentric core and sheath type spinneret and made into conjugated filament web with a fineness of 3.5 d/f. Instead of using the low melting point component resin of the conjugated filament used in Example 3, an ethylene-octene copolymer comprising 2.0 wt. % of 1-octene and ethylene-octene copolymer comprising 13.4 wt. % of 1-octene (the melting points evaluated by DSC were respectively 121° C. and 100° C.) were used as the low melting point component resins in Examples 4 and 5. The temperatures of the position corresponding to 10% of the area from the side of the melting starting point of the endothermic peak of an entire conjugated fiber evaluated by DSC were respectively 92° C. and 73° C., and the temperatures of the position corresponding to 20% of the area from the side of the melting starting point of the endothermic peak of the low melting point component of the conjugated fiber were respectively 87° C. and 69° C. The resultant concentric core and sheath type conjugated filaments were made into a web having a basis weight of 25 g/m$^2$ by controlling the moving rate of the endless belt conveyor and then introduced into the thermal embossing roll. At the same time, the linear low density polyethylene films as used in Example 1 (a melting starting point of the endothermic peak evaluated from DSC analysis was 61° C., a melting completion point was 132° C., and a melting point was 120° C.) were introduced at the side of the thermal rubber roll. The above mentioned webs and films were thermally adhered at the embossing roll temperature of respectively 75° C. and 58° C., the rubber roll temperature of respectively 56° C. and 40° C., a linear load of 28 kg/cm, and the processing rate of 10 m/min. At this time, the shape of the convex portion of this embossing roll was a regular square and the area of each convex portion was 0.25 mm$^2$ (0.5×0.5 mm), the height of the convex portion was 1.0 mm and the area ratio of the convex portion was 4%.

The peeling strength between the non-woven fabric and a film of the resultant laminated non-woven fabric sheet was measured. The value was 90 g/a width of 2.5 cm and 85 g/a width of 2.5 cm, showing an adhesion which would withstand use. Moreover, no defects such as pin-holes due to heat were observed on the film portion. The pattern of the endothermic peak of an entire conjugated fiber evaluated by DSC was classified as the type shown in FIG. 1.

EXAMPLE 6

Instead of using the concentric core and sheath type conjugated fiber used in Example 1, a concentric core and sheath type conjugated fiber composed of polypropylene (the melting point from DSC analysis was 163° C.) as a core component and ethylene-butene-propylene terpolymer comprising 2.5 wt. % of ethylene and 4.5 wt. % of 1-butene (the melting point from DSC analysis was 142° C.) as a sheath component at the volume ratio of 50:50 was prepared. And a side-by-side type conjugated fiber composed of polypropylene (the melting point from DSC analysis was 163° C.) and linear low density polyethylene (the melting point from DSC analysis was 125° C.) at the volume ratio of 45:55 was prepared. Each conjugated fiber was a staple fiber having a fineness of 2 d/f and a cut length of 51 mm. The mixture in which the above mentioned both conjugated fibers were blended at the weight ratio of 70:30 was made into a web by the carding method to form a web having a basis weight of 25 g/m$^2$. (The temperatures of the position corresponding to 10% of the area from the side of the melting starting point of the endothermic peak of an entire conjugated fiber evaluated by DSC was 113° C.) Then, the web was introduced into the thermal embossing roll. At the same time, linear low density polyethylene films as used in Example 1 (a melting starting point of the endothermic peak from DSC analysis was 61° C., a melting completion point was 132° C., and a melting point was 120° C.) were introduced at the side of the thermal rubber roll. The web and the film were thermally adhered at the embossing roll temperature of 119° C., the rubber roll temperature of 55° C., a linear load of 42 kg/cm, and the processing rate of 10 m/min. At this time, the shape of the convex portion of this embossing roll was a laterally longer rhombus and the area of each convex portion was 0.35 mm$^2$ (1.18×0.59 mm), the height of the convex portion was 0.65 mm and the area ratio of the convex portion was 15%.

The peeling strength between the non-woven fabric and film of the resultant laminated non-woven fabric sheet was measured. The value was 90 g/a width of 2.5 cm. Moreover, no defects such as pin-holes due to heat were observed on the film portion. The pattern of the endothermic peak of an entire conjugated fiber evaluated by DSC was classified in the type shown in FIG. 7.

EXAMPLES 7 and 8

Instead of using the concentric core and sheath type conjugated fiber used in Example 1, concentric core and sheath type conjugated fibers composed of polypropylene (the melting point from DSC analysis was 163° C.) as a core component and ethylene-propylene copolymer comprising 5.2 wt. % of ethylene and ethylene-propylene copolymer comprising 6.1 wt. % of ethylene (the melting points from DSC analysis were respectively 141° C. and 132° C.) as a sheath component at the volume ratio of 60:40 were prepared. Each conjugated fiber was a staple fiber having the fineness of 2 d/f and a cut length of 51 mm and was formed into a web having a basis weight for non-woven fabric of 25 g/m² by the carding method. The webs were thermally adhered by the hot air through processing method at the processing temperature of respectively 140° C. and 133° C., to thus produce non-woven fabrics. The temperatures of the position corresponding to 10% of the area from the side of the melting starting point of the endothermic peak of an entire conjugated fiber evaluated by DSC were respectively 123° C. and 115° C. Then, the non-woven fabrics were introduced into an ultrasonic welding machine. At the same time, polypropylene film having a thickness of 25 μm and a water vapor permeability of 1800 g/m² ·24 h obtained by the stretching method (a melting starting point of the endothermic peak from DSC analysis was 108° C., a melting completion point was 167° C., and a melting point was 159° C.) was introduced at a horn side (herein, the horn denotes the portion of the ultrasonic welding apparatus for welding process with a welding roller at the tip thereof). The non-woven fabric and the film were adhered at the pressure of 1 kg/cm², an output control of 3 and 7 (according to the scales of the control knob for controlling the welding strength by controlling the power of "Brother Ultrasonic welding apparatus BU3-115S," the product of the BROTHER INDUSTRIES, LTD), and at the welding ratio of 6 m/min. The welding roller used herein is as follows. The shape of the welding roller was 23 mm in width and 50.5 mm in a diameter. The roller had convex portions on its surface, the shape of the convex portion being a rectangular parallelepiped with a length of 2 mm, a width of 1 mm, and a height of 1 mm. The above mentioned rectangular parallelepipeds were arranged with a spacing of 1.2 mm on the surface of the roller. The length direction of the convex portion was obliquely at an angle of 45 degrees with respect to the roller axis.

The peeling strength between the non-woven fabric and film of the resultant laminated non-woven fabric sheets was measured. The value was 150 g/a width of 2.5 cm, and 135 g/a width of 2.5 cm, exhibiting sufficient adhesion. Moreover, no defects such as pin-holes due to heat were observed on the film portion. Both pattern of the endothermic peak of entire conjugated fibers evaluated by DSC were classified as the type shown in FIG. 4.

EXAMPLE 9

Instead of using the conjugated filament used in Example 3, a concentric core and sheath type conjugated fiber composed of polyethylene terephthalate (the melting point from DSC analysis was 257° C.) as a core component and butene-propylene copolymer comprising 20.1 wt. % of 1-butene (the melting point from DSC was 130° C.) as a sheath component at the volume ratio of 40:60 was made by the melt spinning method using a concentric core and sheath type spinneret. Similar to Example 3, under the excellent spinning conditions, the filament webs were collected. The resultant filaments had a fineness of 2.6 d/f. The temperature of the position corresponding to 10% of the area from the side of the melting starting point of the endothermic peak of an entire conjugated fiber evaluated by DSC was 110° C., and the temperature of the position corresponding to 20% of the area from the side of the melting starting point of the endothermic peak of the low melting point component of the conjugated fiber was 115° C. The obtained concentric core and sheath type conjugated filaments were made into a web having a basis weight of 25 g/m² by controlling the moving rate of the endless belt conveyor. Then, the webs were introduced into the thermal embossing roll. At the same time, polypropylene film as used in Examples 7 and 8 (a melting starting point of the endothermic peak from DSC analysis was 108° C., a melting completion point was 167° C., and a melting point was 159° C.) was introduced at the side of the thermal rubber roll. The webs and the films were thermally adhered at the embossing roll temperature of 112° C., the rubber roll temperature of 70° C., a linear load of 42 kg/cm, and the processing rate of 20 m/min. At this time, the shape of the surface of the convex portion of the embossing roll was a regular square and the area of each convex portion was 0.25 mm² (0.5×0.5 mm), the height of the convex portion was 1.0 mm and the area ratio of the convex portion was 4%.

The peeling strength between the non-woven fabric and film of the resultant laminated non-woven fabric sheet was measured. The value was 100 g/a width of 2.5 cm. Moreover, no defects such as pin-holes due to heat were observed on the film portion. The pattern of the endothermic peak of an entire conjugated fiber evaluated by DSC was classified as the type shown in FIG. 1.

EXAMPLE 10

Instead of the conjugated filament used in Example 9, a concentric core and sheath type conjugated fiber composed of polypropylene (the melting point from DSC analysis was 161° C.) as a core component and ethylene-butene-propylene terpolymer comprising 13.2 wt. % of ethylene and 1.1 wt. % of 1-butene (the melting point from DSC analysis 131° C.) as a sheath component at the volume ratio of 55:45 was made by the melt spinning method by the use of a concentric core and sheath type spinneret. Similar to Example 9, under the excellent spinning conditions, filament webs were collected. The resultant filament had a fineness of 2.5 d/f. The temperature of the position corresponding to 10% of the area from the side of the melting starting point of the endothermic peak of an entire conjugated fiber evaluated by DSC was 111° C. The resultant concentric core and sheath type conjugated filament was formed into non-woven fabrics having a basis weight of 25 g/m² by controlling the moving rate of the endless belt conveyor. Then, the web was introduced into the thermal embossing roll. At the same time, a polypropylene film as used in Examples 7 and 8 (a melting starting point of the endothermic peak from DSC analysis was 108° C., a melting completing point was 167° C., and a melting point was 159° C.) was introduced at the side of the thermal rubber roll. The web and the film were thermally adhered at the embossing roll temperature of 110° C., the rubber temperature of 70° C., a linear load of 28 kg/cm, and the processing rate of 10 m/min. At this time, the shape of the convex portion of this embossing roll was a laterally longer rhombus and the area of each convex portion was 0.25 mm² (0.5×0.5 mm), the height of the convex portion was 1.0 mm and the area ratio of the convex portion was 4%.

The peeling strength between the non-woven fabric and film of the resultant laminated non-woven fabric sheet was measured. The value was 120 g/a width of 2.5 cm. Moreover, no defects such as pin-holes due to heat were observed on the film portion. The pattern of the endothermic peak of an entire conjugated fiber evaluated by DSC was classified as the type shown in FIG. 6.

EXAMPLE 11

A concentric core and sheath type conjugated fiber composed of polypropylene (the melting point from DSC analysis was 160° C.) as a core component and linear low density polyethylene (the melting point from DSC analysis was 122° C.) as a sheath component at the volume ratio of 50:50 was made by the melt spinning method by the use of a concentric core and sheath type spinneret. The spinneret had 120 circular spinning holes with a diameter of 0.4 mm. The group of fibers spun out of this spinneret was introduced into an air sucker followed by drawing and stretching to obtain a group of filaments. Then, a group of filaments discharged from the air sucker was made to pass between a couple of vibrating wing-like tools for an opening. A group of the opened filaments was collected on the endless belt conveyor having a suction apparatus on the back face to form filament webs. At this time, the fineness of the filament was made 2.2 d/f by varying the stretching rate of the air sucker. The resultant concentric core and sheath type conjugated filament was made into a web having a basis weight of non-woven fabric of 25 g/m² by controlling the moving rate of the endless belt conveyor. Then, the non-woven fabric was obtained by thermal adhesion at an embossing roll temperature of 118° C., a flat roll temperature of 116° C., a linear load of 70 kg/cm, and a processing rate of 35 m/min. At this time, the shape of the convex portion of this embossing roll was a regular square and the area of each convex portion was 0.36 mm² (0.6×0.6 mm), the height of the convex portion was 0.7 mm, and the area ratio of the convex portion was 9%. The temperature of the position corresponding to 10% of the area from the side of the melting starting point of the endothermic peak of an entire conjugated fiber evaluated by DSC is 101° C., and the temperature of the position corresponding to 20% of the area from the side of the melting starting point of the endothermic peak of the low melting point component of the conjugated fiber is 105° C. Then, the resultant non-woven fabric was introduced into the heated embossing roll. At the same time, the linear low density polyethylene film as used in Example 1 (a melting starting point of the endothermic peak from DSC analysis was 61° C., a melting completion point was 132° C., and a melting point was 120° C.) was introduced into the side of a flat roll (a chrome mirror face roll). The non-woven fabric and the film were thermally adhered at the embossing roll temperature of 113° C., the thermal flat roll temperature of 108° C., a linear load of 42 kg/cm, and the processing rate of 10 m/min. At this time, the shape of the surface of the convex portion of this embossing roll was a laterally longer rhombus, and the area of each convex portion was 0.35 mm² (1.18×0.59 mm), the height of the convex portion was 0.65 mm and the area ratio of the convex portion was 15%.

The peeling strength between the non-woven fabric and film of the resultant laminated non-woven fabric sheet was measured. It was 120 g/a width of 2.5 cm, exhibiting sufficient adhesion. Moreover, no defects such as pin-holes due to heat and generation of wrinkle due to heat shrinkage were observed on the film portion. The pattern of the endothermic peak of an entire conjugated fiber evaluated by DSC was classified as the type shown in FIG. 1.

EXAMPLE 12

A concentric core and sheath type conjugated fiber composed of polypropylene (the melting point from DSC analysis was 160° C.) as a core component and linear low density polyethylene (the melting point from DSC analysis was 122° C.) as a sheath component at the volume ratio of 50:50 was made by the melt spinning method by using a concentric core and sheath type spinneret. Similar to Example 11, under the excellent spinning conditions, filament webs were collected. The resultant filament had a fineness of 2.2 d/f. The temperature of the position corresponding to 10% of the area from the side of the melting starting point of the endothermic peak of an entire conjugated fiber evaluated by DSC was 101° C., and the temperature of the position corresponding to 20% of the area from the side of the melting starting point of the endothermic peak of the low melting point component of the conjugated fiber was 105° C. The resultant concentric core and sheath type conjugated filament was made into a web having a basis weight of 25 g/m² by controlling the moving rate of the endless belt conveyor. Then, the web was introduced into the thermal embossing roll. At the same time, a linear low density polyethylene film as used in Example 11 (a melting starting point of the endothermic peak form DSC analysis was 61° C., a melting completion point was 132° C. and a melting point was 120° C.) was introduced at the side of a flat roll (a chrome mirror face roll). The web and the film were thermally adhered at the embossing roll temperature of 109° C., the thermal flat roll temperature of 109° C., a linear load of 42 kg/cm, and the processing rate of 10 m/min. At this time, the shape of the convex portion of this embossing roll was a laterally longer rhombus and the area of each convex portion was 0.35 mm² (1.18×0.59 mm), the height of the convex portion was 0.65 mm and the area ratio of the convex portion was 15%.

The peeling strength between the non-woven fabric and film of the resultant laminated non-woven fabric sheet was measured. The value was 110 g/a width of 2.5 cm, exhibiting sufficient adhesion. Moreover, no defects such as pin-holes due to heat and generation of wrinkle due to heat shrinkage were observed in the film portion. The pattern of the endothermic peak of an entire conjugated fiber evaluated by DSC was classified as the type shown in FIG. 1.

EXAMPLE 13

Instead of the concentric core and sheath type conjugated fiber used in Example 1, the concentric core and sheath type conjugated fiber composed of polypropylene (the melting point from DSC analysis was 160° C.) as a core component and ethylene-butene-propylene terpolymer comprising 2.5 wt. % of ethylene and 4.5 wt. % of 1-butene (the melting point from DSC analysis was 142° C.) as a sheath component at the volume ratio of 50:50 was made by the melt spinning method by using a concentric core and sheath type spinneret. Similar to Example 11, under the excellent spinning conditions, filament webs were collected. The resultant filament had a fineness of 2.2 d/f. The resultant concentric core and sheath type conjugated filaments were made into a web having a basis weight of 25 g/m² by controlling the moving rate of the endless belt conveyor. The web was thermally adhered at the embossing roll temperature of 123° C., the flat roll temperature of 121° C., a linear load of 70 kg/cm the processing rate of 35 m/min to form a non-woven fabric. At this time, the shape of the convex portion of this embossing roll was a regular square and the area of each convex portion was 0.36 mm² (0.6×0.6 mm), the height of the convex portion was 0.7 mm and the area ratio of the convex portion is 9%. The temperature of the position corresponding to 10% of the area from the side of the melting starting point of the endothermic peak of an entire conjugated fiber evaluated by DSC was 111° C. Then, the web was introduced into the thermal embossing roll. At the same time, a propylene film at a thickness of 25 μm and a water vapor permeability of 1800 g/m²·24 h and being obtained by the stretching method (a melting starting point of the endothermic peak from DSC analysis was 108° C., a melting completion point was 167° C., and a melting point was 159° C.) was introduced into the side of a flat roll (a chrome mirror face roll). The non-woven fabric and the film were thermally adhered at the embossing roll temperature of 130° C., the thermal flat roll temperature of 130° C., a linear load of 28 kg/cm, and the processing rate of 10 m/min. At this time, the shape of the convex portion of this embossing roll was a laterally longer rhombus and the area of each convex portion was 0.35 mm² (1.18×0.59 mm), the height of the convex portion was 0.65 mm and the area ratio of the convex portion was 15%.

The peeling strength between the non-woven fabric and the film of the resultant laminated non-woven fabric sheet was measured. The value was 140 g/a width of 2.5 cm, exhibiting sufficient adhesion. Moreover, no defects such as pin-holes due to heat and generation of wrinkle due to heat shrinkage were observed in the film portion. The pattern of the endothermic peak of an entire conjugated fiber evaluated by DSC was classified as the type shown in FIG. 6.

COMPARATIVE EXAMPLE 1

A concentric sheath and core type conjugated fiber composed of polypropylene (the melting point from DSC analysis was 160° C.) as a core component and linear low density polyethylene (the melting point form DSC analysis was 125° C.) as a sheath component at the volume ratio of 50:50 and being a staple fiber of 2 d/f in fineness and 51 mm in a cut length was made into a web having a basis weight of 25 g/m² by the carding method. The temperature of the position corresponding to 10% of the area from the side of the melting starting point of the endothermic peak of an entire conjugated fiber evaluated by DSC was 103° C., and the temperature of the position corresponding to 20% of the area from the side of the melting starting point of the endothermic peak of the low melting point component of the conjugated fiber was 105° C. The web was introduced into a thermal embossing roll. At the same time, polypropylene film having a thickness of 25 μm and a water vapor permeability of 1800 g/m²·24 h and being obtained by the stretching method (a melting starting point of the endothermic peak from DSC analysis was 108° C., a melting completion point was 167° C., and a melting point was 159° C.) was introduced at the side of the thermal rubber roll. The web and the film were thermally adhered at the embossing roll temperature of 114° C., the rubber roll temperature of 70° C., a linear load of 42 kg/cm, and the processing rate of 10 m/min. At this time, the shape of the surface of the convex portion of this embossing roll was the same as Example 1 . The resultant laminated non-woven fabric retained the shapes of a film and a non-woven fabric, however they were peeled apart easily by hand without any resistance. Therefore, the resultant laminated non-woven fabric was not considered for practical applications.

When the above mentioned non-woven fabric and film were thermally adhered at the embossing roll temperature of 135° C., the rubber temperature of 80° C., a linear load of 42 kg/cm, and the processing rate of 10 m/min, the non-woven fabric and the film were adhered, however, the hand feeling of the non-woven fabric was hard, and furthermore, the film had holes. The resultant laminated non-woven fabric sheet had no practical use. Herein, the pattern of the endothermic peak of an entire conjugated fiber evaluated by DSC was classified as the type shown in FIG. 1.

COMPARATIVE EXAMPLE 2

Instead of using the concentric core and sheath type conjugated fiber used in Example 3, a concentric core and sheath type conjugated fiber composed of polyethylene terephthalate (the melting point from DSC analysis was 257° C.) as a core component and polypropylene (the melting point from DSC analysis was 160° C.) as a sheath component at the volume ratio of 40:60 was made by the melt spinning method by the use of a concentric core and sheath type spinneret. Similar to Example 3, under the excellent spinning conditions, the filament webs were collected. The obtained filaments had a fineness of 2.2 d/f. The temperature of the position corresponding to 10% of the area from the side of the melting starting point of the endothermic peak of an entire conjugated fiber evaluated by DSC was 136° C., and the temperature of the position corresponding to 20% of the area from the side of the melting starting point of the endothermic peak of the low melting point component of the conjugated fiber was 142° C. The resultant concentric core and sheath type conjugated filaments were made into a web having a basis weight of 25 g/m² by controlling the moving rate of the endless belt conveyor. Then, the web was introduced into the thermal embossing roll. At the same time, a linear low density polyethylene film as used in Example 1 (a melting starting point of the endothermic peak from DSC analysis was 61° C., a melting completion point was 132° C., and a melting point was 120° C.) was introduced at the side of the thermal rubber roll. And the webs and the films were thermally adhered at the embossing roll temperature of 125° C., the rubber roll temperature of 60° C., a linear load of 42 kg/cm, and the processing rate of 10 m/min. At this time, the shape of the convex portion of the embossing roll was the same as Example 1 . The resultant laminated non-woven fabrics retained the shapes of a film and a non-woven fabric, however they were be peeled apart easily by hand without any resistance. Therefore, the resultant laminated non-woven fabric was not considered for practical applications.

When the above mentioned non-woven fabric and film were thermally adhered at the embossing roll temperature of 145° C., the rubber roll temperature of 100° C., a linear load of 42 kg/cm, and the processing rate of 10 m/min, the non-woven fabric and the film were adhered, however, the film had holes and the film was wrinkled by heat. The resultant laminated non-woven fabric sheet had no practical use. Herein, the pattern of the endothermic peak of an entire conjugated fiber evaluated by DSC was classified as the type shown in FIG. 1.

COMPARATIVE EXAMPLE 3

Instead of using the conjugated filaments used in Example 3, a fiber comprising a single component, polypropylene (the melting point from DSC analysis was 160° C.) was spun, and then, similar to Example 3, filament webs were collected. The resultant filaments had a fineness of 2.3 d/f. The temperature of the position corresponding to 10% of the area from the side of the melting starting point of the endothermic peak of an entire fiber evaluated by DSC was 138° C. The resultant single component filaments was made into a web having a basis weight of 25 g/m² by controlling the moving rate of the endless belt conveyor. Then, the webs were introduced into the thermal embossing roll. At the same time, the polypropylene film as used in Examples 7 and 8 (a melting starting point of the endothermic peak form DSC analysis was 108° C., a melting completion point was 167° C., and a melting point was 159° C.) was introduced at the side of the thermal rubber roll. The webs and the films were thermally adhered at the embossing roll temperature of 145° C., the rubber roll temperature of 95° C., a linear load of 28 kg/cm, and the processing rate of 10 m/min. In this case, the non-woven fabric and the film were adhered. However, the fibers were uniformly melted, so that the hand feeling of the laminated non-woven fabric had no practical use. The resultant laminated non-woven fabric sheet had no practical use. At this time, the shape of the convex portion of the embossing roll was the same as Example 1.

According to the present invention, a composite laminated non-woven fabric sheet comprising thermoplastic crystalline film and a non-woven fabric comprising a thermoplastic conjugated fiber are provided, wherein the thermoplastic conjugated fiber comprises a low melting point component and a high melting point component, and the difference in the melting point between a low melting point component and a high melting point component is not less than 10° C.; the difference in the melting point between the thermoplastic crystalline film and the low melting point component of the conjugated fiber is not more than 30° C.; and the temperature of the position corresponding to 10% of the area from the side of the melting starting point of the endothermic peak of an entire conjugated fiber evaluated by DSC is between the melting starting point and the melting completion point of the endothermic peak of the film evaluated by DSC. Therefore, in the above mentioned laminated non-woven fabric sheet, a non-woven fabric and a film can be widely and uniformly adhered without using the specific adhesive agent, so that the weight of the members can be lightened. Moreover, in a case where the composite sheet of the present invention is used in the applications such as paper diapers or sanitary napkins, the processing steps can be simplified. In addition, thermoplastic conjugated fibers in which the difference in the melting point between the low melting point component and the high melting point component is not less than 10° C. are used, so that the fiber of the non-woven fabric is not thermally deteriorated in physical properties during the thermal adhering process. Moreover, since the difference in the melting point between the melting point of the thermoplastic crystalline film and the low melting point component of the conjugated fiber is not more than 30° C., holes are not generated in the film, the adhesion between the non-woven fabric and the film is excellent, and the appearance is not deteriorated due to the adhesive agent. The laminated non-woven fabric sheet having an excellent appearance can be provided, and applied usefully as the water proof substrates of the paper diapers or sanitary napkins or the like. Moreover, if the low melting point component of the fiber is selected in accordance with the film materials, the non-woven fabric can be bonded to the various kinds of films.

In the laminated non-woven fabric sheet of the present invention, it is preferable that an endothermic peak of the thermoplastic conjugated fiber of an entire conjugated fiber evaluated by DSC is separated into an endothermic peak of a low melting point component and an endothermic peak of a high melting point component with respect to the base line of the endothermic peak curve, and the temperature of the position corresponding to 20% of the area from the side of the melting starting point of the endothermic peak of the low melting point component of the conjugated fiber is between the melting starting point and the melting completion point of the endothermic curve of the thermoplastic crystalline film evaluated by DSC. By such preferred embodiment, the thermal adhesion can easily be conducted under the temperature conditions in which thermal damage such as a relaxation of orientation of the high melting point component is less likely to occur.

In the laminated non-woven fabric sheet of the present invention, it is further preferable that the melting point of thermoplastic crystalline film is higher than the low melting point component of the thermoplastic conjugated fiber. By such preferred embodiment, the low melting point component of the conjugated fiber is adhered to the film by melting the low melting point component of the conjugated fiber, so that deterioration in the physical property of the film itself or a generation of holes can be prevented, thereby providing the laminated non-woven fabric sheet which is excellent in the water proof property.

In the laminated non-woven fabric sheet of the present invention, it is further preferable that the thermoplastic crystalline film has an air permeability and is one selected from the group consisting of a linear low density polyethylene film and a polypropylene film. By such preferred embodiment, these films can easily be adhered to the conjugated fiber, are excellent in a water proof property, have sufficient physical strength, are relatively soft, are low in price, and have an air permeability. Consequently, the users' skin is prevented from getting stuffy and getting a rash due to urination, and the fitness is enhanced. Therefore, the laminated non-woven fabric sheet of the present invention can preferably be used for the water-proof substrates of paper diapers, sanitary napkins or the like.

In the laminated non-woven fabric sheet of the present invention, it is further preferable that the material of the thermoplastic crystalline film and the material of the low melting point component of the thermoplastic conjugated fiber belong to a homolog group and the difference in the melting points between the thermoplastic crystalline film and the low melting point component of the conjugated fiber is not more than 5° C. By such preferred embodiment, the laminated non-woven fabric sheet can be provided, in which the thermal adhesion is easily conducted and the adhesive strength is excellent.

In the laminated non-woven fabric sheet of the present invention, it is further preferable that the low melting point component of the thermoplastic conjugated fiber is at least one selected from the group consisting of linear low density polyethylene, olefin binary copolymer and olefin terpolymer. By such preferred embodiment, the laminated non-woven fabric sheet is provided, that is manufactured at low cost, is excellent in a water proof property, and is excellent in thermal adhesion and in adhesive strength to polyolefin film, in particular, a linear low density polyethylene film, a high density polyethylene film, a polypropylene film or the like.

In the laminated non-woven fabric sheet of the present invention, it is further preferable that the olefin binary copolymer is a an ethylene-propylene copolymer comprising 85 to 99 wt. % of propylene and 1 to 15 wt. % of ethylene. By such preferred embodiment, the laminated non-woven fabric sheet is provided, that is manufactured at low cost, is excellent in a water proof property, and is excellent in thermal adhesion and in adhesive strength to polyolefin film, in particular, polypropylene film or the like.

In the laminated non-woven fabric sheet of the present invention, it is further preferable that the olefin binary copolymer is a butene-propylene copolymer comprising 50 to 99 wt. % of propylene and 1 to 50 wt. % of 1-butene. By such preferred embodiment, the laminated non-woven fabric sheet is provided, that is manufactured at low cost, is excellent in a water proof property, and is excellent in thermal adhesion and in adhesive strength to polyolefin film, in particular, polypropylene film or the like.

In the laminated non-woven fabric sheet of the present invention, it is further preferable that the olefin binary copolymer is an ethylene-octene copolymer comprising 73 to 99 wt. % of ethylene and 1 to 27 wt. % of 1-octene. By such preferred embodiment, the laminated non-woven fabric sheet is provided, that is manufactured at low cost, is excellent in a water proof property, and is excellent in thermal adhesion and in adhesive strength to polyolefin film, in particular, a linear low density polyethylene film or the like.

In the laminated non-woven fabric sheet of the present invention, it is further preferable that the olefin terpolymer is an ethylene-butene-propylene terpolymer comprising 84 to 97 wt. % of propylene, 1 to 15 wt. % of 1-butene and 1 to 10 wt. % of ethylene. By such preferred embodiment, the laminated non-woven fabric sheet is provided, that is manufactured at low cost, is excellent in a water proof property, and is excellent in thermal adhesion and in adhesive strength to polyolefin film, in particular, polypropylene film or the like.

In the laminated non-woven fabric sheet of the present invention, it is further preferable that the film and the non-woven fabric are laminated by a thermal adhesion bonding. By such preferred embodiment, an environmental contamination generated when the solvent type adhesive agents is used does not occur. In a case where the laminated non-woven fabric is used for the applications of contacting directly with the human body, for example, for the paper diapers, sanitary napkins or the like, there is less possibility of an adverse influence on the safety of the user. For example, there is no possibility of having the users' skin get sticky because of the harmful chemical substances extracted out of the sheet. In addition, no adhesives are present to deteriorate the appearance, so that an excellent laminated non-woven fabric sheet having a good appearance and having a soft touch can be provided.

In the laminated non-woven fabric sheet of the present invention, it is further preferable that the non-woven fabric comprising thermoplastic conjugated fiber is a thermoplastic conjugated fiber comprising filament. By such preferred embodiment, the strength of an entire laminated non-woven fabric sheet is enhanced. Moreover, a thermoplastic conjugated fiber comprising filaments can cheaply be manufactured as compared with the non-woven fabric made of staple fibers, and has little fuzz. In particular, a non-woven fabric comprising filament manufactured by the spun bond method is preferably used since it has a high strength and little fuzz. Especially, in the case of the spun bond method, a non-woven fabric can be manufactured without fiber spinning oil agent, and a stretching step is not conducted after the solidification of a melt spinning filament spun out of the spinneret, thus a crystalline orientation is mild and the melting point is accordingly lower and the fibers are easily bonded to the thermoplastic film.

INDUSTRIAL APPLICABILITY

As mentioned above, the laminated non-woven fabric sheet of the present invention is suitable for the water proof substrates of paper diapers or sanitary napkins or the like, but is not limited to them alone.

What is claimed is:

1. A composite laminated sheet comprising a thermoplastic crystalline film and a non-woven fabric comprising thermoplastic conjugated fibers, said thermoplastic conjugated fiber being composed of a low melting point component and a high-melting point component, and the difference in the melting points between the low melting point component and the high melting point component is not less than 10° C.;

wherein the low melting point component is at least one selected from the group consisting of a butene-propylene copolymer comprising 50 to 99 wt. % of propylene and 1 to 50 wt. % of 1-butene, an ethylene-octene copolymer comprising 73 to 99 wt. % of ethylene and 1 to 27 wt . % of 1-octene, and an ethylene-butene-propylene copolymer comprising 84 to 97 wt. % of propylene, 1 to 15 wt. % of 1-butene and 1 to 10 wt. % of ethylene;

the difference in the melting point between said thermoplastic crystalline film and said low melting point component of said conjugated fiber is not more than 30° C.; and the temperature of the position corresponding to 10% of the area from the side of a melting starting point of the endothermic peak of an entire conjugated fiber evaluated by DSC is between the melting starting point and the melting completion point of the endothermic peak of said film evaluated by DSC.

2. The composite laminated sheet according to claim 1, wherein the thermoplastic crystalline film has a water vapor permeability not less than 1500 g/m$^2$·24 Hr while keeping a hydraulic pressure resistance of not less than 2000 mm H$_2$O under the following conditions specified in JIS K7129, wherein the test temperature is 32° C. and a relative humidity is 50% RH, and is one selected from the group consisting of a linear low density polyethylene film and a polypropylene film.

3. The composite laminated sheet according to claim 1, wherein an endothermic peak of said thermoplastic conjugated fiber of an entire conjugated fiber evaluated by DSC is separated into an endothermic peak of a low melting point component and an endothermic peak of a high melting point component with respect to the base line of the endothermic peak curve, and the temperature of the position corresponding to 20% of the area from the side of the melting starting point of the low melting point component of the conjugated fiber is between the melting starting point and the melting completion point of the endothermic curve of the thermoplastic crystalline film evaluated by DSC.

4. The composite laminated sheet according to claim 3, wherein the thermoplastic crystalline film has an air permeability and is one selected from the group consisting of a linear low density polyethylene film and a polypropylene film.

5. A The composite laminated sheet according to claim 3, wherein the thermoplastic crystalline film and the low melting point component of the thermoplastic conjugated fiber are made of materials of the same group, and the difference in the melting points between said thermoplastic crystalline film and the low melting point component of the conjugated fiber is not more than 5° C.

6. The composite laminated sheet according to claim 3, wherein the melting point of the low melting point component of the thermoplastic conjugated fiber is lower than the melting point of the thermoplastic crystalline film.

7. The composite laminated sheet according to claim 3, wherein the film and the non-woven fabric are laminated by thermal adhesion bonding.

8. The composite laminated sheet according to claim 3, wherein the non-woven fabric comprising thermoplastic conjugated fiber is a non-woven fabric comprising a thermoplastic conjugated fiber composed of filaments.

9. The composite laminated sheet according to claim 1, wherein the thermoplastic crystalline film and the low melting point component of the thermoplastic conjugated fiber are made of materials of the same group, and the difference in the melting points between said thermoplastic crystalline film and the low melting point component of the conjugated fiber is not more than 5° C.

10. The composite laminated sheet according to claim 1, wherein the melting point of the low melting point component of the thermoplastic conjugated fiber is lower than the melting point of the thermoplastic crystalline film.

11. The composite laminated sheet according to claim 1, wherein the film and the non-woven fabric are laminated by thermal adhesion bonding.

12. The composite laminated sheet according to claim 1, wherein the non-woven fabric comprising thermoplastic conjugated fiber is a non-woven fabric comprising a thermoplastic conjugated fiber composed of filaments.

\* \* \* \* \*